(12) United States Patent
Huoviala

(10) Patent No.: US 8,331,866 B2
(45) Date of Patent: Dec. 11, 2012

(54) QUALITY OF A REALTIME SERVICE

(75) Inventor: Rauno Huoviala, Helsinki (FI)

(73) Assignee: Teliasonera Finland OYJ, Helsinki (FI)

( * ) Notice: Subject to any disclaimer, the term of this patent is extended or adjusted under 35 U.S.C. 154(b) by 1344 days.

(21) Appl. No.: 11/988,041

(22) PCT Filed: Jun. 22, 2006

(86) PCT No.: PCT/FI2006/000224
§ 371 (c)(1),
(2), (4) Date: Feb. 7, 2008

(87) PCT Pub. No.: WO2007/006841
PCT Pub. Date: Jan. 18, 2007

(65) Prior Publication Data
US 2009/0036058 A1    Feb. 5, 2009

(30) Foreign Application Priority Data
Jul. 8, 2005    (FI) ...................................... 20050736

(51) Int. Cl.
*H04B 17/00*    (2006.01)

(52) U.S. Cl. ...................... 455/67.11; 455/405; 455/406

(58) Field of Classification Search ............... 455/67.11, 455/405–408, 423, 424
See application file for complete search history.

(56) References Cited

U.S. PATENT DOCUMENTS

| 7,231,210 B1* | 6/2007 | Croak et al. .................. 455/423 |
| 2002/0072333 A1* | 6/2002 | Gnesda et al. ............... 455/67.1 |
| 2005/0055220 A1 | 3/2005 | Lee et al. |

FOREIGN PATENT DOCUMENTS

| EP | 1 223 708 A2 | 7/2002 |
| EP | 1 453 269 A1 | 9/2004 |
| WO | WO 00/72572 A1 | 11/2000 |
| WO | WO 01/28219 A2 | 4/2001 |
| WO | WO 01/28219 A2 | 4/2001 |

\* cited by examiner

*Primary Examiner* — Tuan H Nguyen
(74) *Attorney, Agent, or Firm* — Cozen O'Connor

(57) ABSTRACT

The present invention relates to evaluating a real-time service performance in a wireless telecommunications system. According to the invention real-time transmission packet arrival times and number of lost real-time transmission packets of the received data in a terminal equipment are measured. The charging information is modified in the billing system in response to the assessed quality of the real time service.

13 Claims, 1 Drawing Sheet

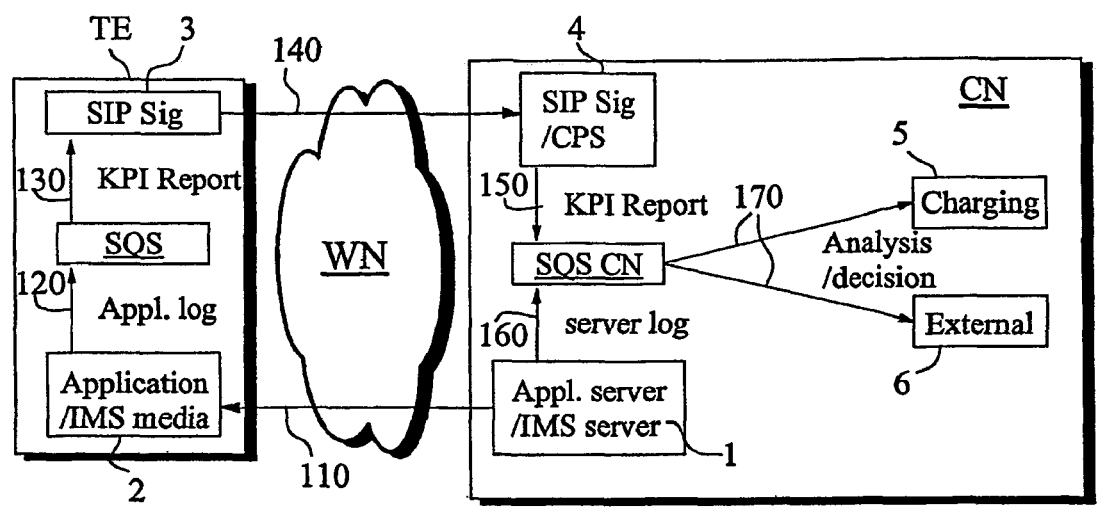

QUALITY OF A REALTIME SERVICE

PRIORITY CLAIM

This is a U.S. national stage of application No. PCT/FI2006/000224, filed on 22 Jun. 2006. Priority is claimed on the following application: Finland Application No. 20050736, filed 8 Jul. 2005, the content of which is incorporated here by reference.

FIELD OF THE INVENTION

The present invention relates to quality of service in telecommunication technology, and more particularly to evaluation of the quality of received real-time service in a wireless network.

BACKGROUND OF THE INVENTION

Wireless terminals are increasingly used to transmit services that create real-time experience for the end user, or user of the terminal. As these services are being transmitted though wireless packet-switched network, operators or service providers must pay attention to the quality of service.

The end user can often experience situations with mobile real-time services where the service is badly corrupted. These incidents are usually caused by mobile network resulting from system malfunction, too high Bit Error Rate, overloading, handovers or inter-system handovers. Problems can be also caused by a malfunctioning mobile terminal. As a result the real-time service may be discontinuous or the video/audio stream quality may be below the acceptable limit. Especially with real time services all the data packets may be delivered to the terminal intact, but the fact that the packets were greatly delayed and jittered is the key factor that indicates the service corruption.

The Real-Time Transport Protocol (RTP) is an Internet protocol standard that specifies a way for programs to manage the real-time transmission of multimedia data over either unicast or multicast network services. RTP is specified in Internet Engineering Task Force (IETF) Request for Comments (RFC) 1889. RTP is commonly used for example in Internet telephony applications. Similar services are emerging on the wireless network systems, such as IMS (IP Multimedia subsystem). RTP does not in itself guarantee real-time delivery of multimedia data since this is dependent on network characteristics.

WO03034685 describes a solution where the volume of transmitted data is determined and sent from terminal to a billing system. The billing system takes into account the sent and received data and obtains the cost of data received by the mobile station.

The problem of this approach is that the network is not aware of the actual quality of the real-time service, how the user has perceived the service. The amount of received data does not necessarily correlate to the quality of real-time services, as they typically require an even data flow.

A 3GPP standard publication TS 22.115, version 6.4.0 describes a solution in which the terminal requests QoS (Quality of Service) parameters that the network either accepts, rejects or alters. These QoS parameters guide the radio and core networks in such a manner that transmission would be realized under these parameters. However, these parameters do not guarantee the QoS level required by the real-time application run by the terminal. The application may still run poorly e.g. due to cell handover, since the QoS parameters are still the same as in the previous cell. The terminal sends information about the received QoS parameters to the core network or to the billing system, where charging may be applied to different QoS schemes. Sending only received QoS parameters back to the network or billing system does not describe the quality of the real-time service.

BRIEF DESCRIPTION OF THE INVENTION

An object of the present invention is to provide a method and an apparatus for implementing the method so as to overcome the above problem or at least to alleviate it. The objects of the invention are achieved by a method, an element for a wireless terminal, a wireless terminal, a computer-readable storage medium and a computer software product, which are characterized by what is stated in the independent claims. The preferred embodiments of the invention are disclosed in the dependent claims.

The invention is used to evaluate the real-time service performance in a telecommunication system. Terminal receiving the real-time service measures key performance indicators of the data flow. A log file is created containing these indicators on the terminal side of the network. The terminal sends the log file to the core network, where this file is used to assess the quality of the received real-time service data flow versus the sent data flow. Service charging can be modified according to the received and assessed quality of a real-time service. For example a poor quality service is not charged or can be re-ordered without additional cost. Also, this quality assessment can be used for service testing and statistical control.

With this invention, the operator can determine if the real-time service delivery has completed successfully, the user experience has been within the acceptable limits and the service can be charged. This enhances service quality control in general and gives important advance to customer service. Also statistical control of service quality becomes accurate and systematic, which makes it easy to find and solve fault situations in network. Further, with this solution can be found out whether the bad end user quality is caused by the service provider, by operators data transmission or by the terminal's dysfunction. This is very important in mobile business, as the services are becoming more quality demanding and often experience failures.

BRIEF DESCRIPTION OF THE DRAWING

In the following, the invention will be described in greater detail by means of preferred embodiments with reference to the accompanying drawing, in which FIG. 1 is a block diagram illustrating a telecommunications system and the functionality of the invention.

DETAILED DESCRIPTION OF THE INVENTION

FIG. 1 shows a block diagram of a telecommunication system wherein a terminal equipment TE is connected via a wireless packet-switched network WN to core network CN. FIG. 1 contains also arrows 110-170 illustrating the information flows between each element.

Core network CN contains also elements of the IP Multimedia subsystem IMS. It should be noted that the FIGURE only shows elements that are necessary to illustrate the invention, and the system architecture can differ from what is disclosed herein without any significance to the basic idea of the invention. Even though the invention will be described below mainly in connection with the GPRS/GSM or a corresponding system, this does not restrict the invention in other types of wireless systems. Examples of these systems are UMTS (Universal Mobile Telecommunications System), WCDMA (Wideband Code Division Multiple Access), CDMA2000 (Code Division Multiple Access) WLAN (Wireless Local Area Network), WiFi (Wireless Fidelity) or alike.

In a preferred embodiment the network CN conforms to IMS (IP Multimedia Subsystem) network. The network CN is arranged to deliver real-time services to the terminal TE. The network CN contains an application server or an IMS server 1 that run the real-time services.

The terminal TE is arranged to connect to real-time services such as PoC (Push to talk Over Cellular), streaming media players or video sharing applications. In the preferred embodiment the terminal TE is an IMS terminal. It may also be any mobile handset, PDA device, handheld or portable computer or a system embedded to other complex such as a car. The terminal equipment TE contains an application 2 suitable for connecting to the service data flow 110 that application server 1 is sending. The application 2 sends the application log to element SQS for further management.

The terminal equipment TE has an element SQS that has the features required by the invention; it measures the data 110 received by the terminal TE, creates a log file 120 of the measurement data and sends it to the network, arrow 130. The element SQS can be a part of terminal equipment's operating system or a separate application. The element SQS can be implemented on to integrated circuit or to an external circuit, such as a memory card, SIM card (SIM, Subscriber Identity Module) or alike. The element SQS can also be arranged to a software product that can be downloaded and/or installed to the terminal system. The terminal software can be included in the IMS service client or to a separate software which observes the service clients' performance.

The element SQS contains one or more of the following properties for measuring the received data in the terminal after receiver/application buffer: the amount of data received, the number of packets received, the time of the received packets, real-time transmission packet arrival times, number of lost real-time transmission packets of the received data in a terminal equipment, total packet error ratio, delivery time or total time between the first and the last received packet, maximum packet jitter or delay between two consecutive packets.

Total packet error ratio indicates if non-real time data transmission has not been successful. Also it indicates about the quality of real time services.

Maximum jitter or time between two consecutive packets in the RTP or codec packet stream indicates the possibility if there has been a network caused disconnection in real time voice or video stream in the terminal client. The jittering information can also include certain number of highest jitter values with the time stamp of those packets. With this information the possible disconnection in end user playback can be determined.

Delivery time of the service could also be defined as the time between the first received RTP/codec packet and the last RTP/codec packet. This value tells if the transmission has been too slow or discontinuous for clean playback, even if the maximum jittering values are within acceptable limits.

The terminal element SQS creates a log file of the measured data. The log file can be arranged to a compact foam, arrow 130, delivered to element 3 and sent to from the terminal TE as a Session Initiation Protocol message, arrow 140. The Session Initiation Protocol (SIP) is an IETF standard protocol for initiating an interactive user session that involves multimedia elements. Also other obvious methods delivering the log file 130 can be used, such as SMS or MMS messages. The log file 130 can include more or less detailed information about the received service delivery. The terminal element SQS may also comprise means for assessing some parameters of the quality of the real-time service within the terminal, for example by measuring the uniformity of the received data flow.

To keep the log file message 130 small, it can include only few values that are sufficient to determine the end user experience. If the message size is not a problem, the report can include even the whole transmission details with packet receive times and packet sizes.

An example of simple log file information is in the following table. The information fields can be further encrypted to reduce the message size.

| Event number | 22356 |
| Received data | 4126842B |
| Delivery time | 328441 ms |
| Packet error ratio | 0.012 |
| Max jitter | 2334 ms |

The wireless packet network WN delivers the log file to the IMS core network CN, arrows 140 and 150. A billing system SQS CN is connected to the wireless network WN and to the IMS core network in a matter that it can receive information from all relevant services used and data transferred. The core network CN has means 4 to handle the sent log file, i.e. the SIP message. The billing system SQS CN assesses the quality of service based on the differences between the sent and received data and other information derived from the log file. Using the log file the system SQS CN compares the sent and received data amounts and delivery times. Further it evaluates whether the packet error ratio or max jitter is below predefined threshold.

The billing system SQS CN is able to modify the charging information in response to the assessed quality of the real time service, arrows 170. For example, charging and billing can be modified in a way that insufficient service is not charged, element 5, or can be re-ordered without additional cost, element 6. The real-time service will be delivered again if the received quality has not been within predetermined limit. According to the service, there can exist several charging schemes for different service quality levels.

The log file can be used for service testing and statistical control. With this invention the operator can precisely determine if the end customers real-time service delivery has completed successfully, the service can be charged, and the user experience has been within the acceptable limits. This enhances service quality control in general, and gives important advance to customer service. Also statistical control of service quality becomes accurate and systematic, which makes it easy to find and solve fault situations in network. Further, with this solution can be analyzed the reason for bad end user quality, whether it is caused by operators data transmission or by the terminal's dysfunction.

The present invention is implemented in both terminal and network, for example IMS core network. The network side can also be implemented within IMS core control elements such as CPS, or any other location with access to SIP signalling, application servers, and charging units. The invention can be implemented to a computer-readable storage medium or a computer software product comprising a computer software, wherein the execution of the software in a computer causes the computer to carry out functionality according to the invention.

It will be obvious to a person skilled in the art that, as the technology advances, the inventive concept can be implemented in various ways. The invention and its embodiments are not limited to the examples described above but may vary within the scope of the claims.

The invention claimed is:

1. A method for evaluating a service performance in a telecommunications system, the telecommunications system comprising a terminal equipment and a wireless packet-switched network providing a connection for said terminal, and a billing system connected to the wireless network, the method comprising the steps of:

measuring data of a real-time service received by the terminal equipment,
creating a log file of the measured data,
sending the log file to the billing system,
assessing a quality of service of the real time service based on differences between data of the real time service sent to the terminal and the received data,
measuring real-time transmission packet arrival times and a number of lost real-time transmission packets of the received data in the terminal equipment,
measuring from the received data of the real-time service a delay between two consecutive packets received by the terminal,
adding to the log file a maximum value of measured delays between two consecutive packets received by the terminal, and
modifying charging information for the real-time service in response to the assessed quality of the real time service.

2. The method as claimed in claim 1, further comprising delivering the real-time service to the terminal again if the assessed quality of the real time service does not satisfy a predetermined limit.

3. The method as claimed in claim 1, wherein the network conforms to IP Multimedia Subsystem.

4. The method as claimed in claim 1, wherein the log file is sent as a SIP message.

5. The method as claimed in claim 1, wherein the measured data is used for testing the real-time service.

6. A non-transitory computer-readable storage medium comprising a computer software, wherein the execution of the software in a computer causes the computer to carry out the steps of the method according to claim 1.

7. A computer program stored on a computer memory and executing on a processor which, when used on a computer apparatus causes the processor to execute the steps of the method according to claim 1.

8. An element for a wireless terminal that comprises:
means for measuring data of a real time service received by the terminal,
means for creating a log file of the measured data,
means for sending the log file to a billing system,
means for measuring real-time transmission packet arrival times and a number of lost real-time transmission packets of the received data,
means for assessing a quality of the real time service,
means for measuring from the received data of the real time service a delay between two consecutive packets received by the terminal, and
means for adding to the log file a maximum value of measured delays between two consecutive packets received by the terminal.

9. The element as claimed in claim 8, wherein the wireless terminal is a IP Multimedia Subsystem terminal.

10. The element as claimed in claim 8, wherein the element comprises means for sending the log file as a SIP message.

11. A telecommunication system for evaluating a service performance that comprises:
a terminal equipment and a wireless packet-switched network providing a connection for said terminal;
a billing system connected to the wireless network;
means for measuring data of a real time service received by the terminal equipment;
means for creating a log file of the measured data;
means for sending the log file to the billing system;
means for assessing a quality of service of the real time service based on differences between data of the real time service sent to the terminal and the received data;
means for measuring from the received data of the real-time service a delay between two consecutive packets received by the terminal;
means for adding to the log file a maximum value of measured delays between two consecutive packets received by the terminal;
means for measuring real-time transmission packet arrival times and a number of lost real-time transmission packets of the received data in the terminal equipment; and
means for modifying charging information of the real time service in response to the assessed quality of the real time service.

12. The system as claimed in claim 11, comprising means for delivering the real-time service to the terminal again if the assessed quality of the real time service does not satisfy a predetermined limit.

13. The system as claimed in claim 11, wherein the network conforms to IP Multimedia Subsystem.

* * * * *